United States Patent [19]

Wank et al.

[11] Patent Number: 4,970,108

[45] Date of Patent: Nov. 13, 1990

[54] MULTILAYER FILMS FROM THE USE IN CRASH PADS

[75] Inventors: Joachim Wank, Dormagen; Werner Waldenrath, Cologne; Walter Uerdinger, Leverkusen; Dieter Freitag, Krefeld; Hans E. Braese, Cologne, all of Fed. Rep. of Germany

[73] Assignee: Bayer Aktiengesellschaft, Bayerwerk, Fed. Rep. of Germany

[21] Appl. No.: 502,197

[22] Filed: Mar. 30, 1990

[30] Foreign Application Priority Data

Apr. 6, 1989 [DE] Fed. Rep. of Germany ....... 3911066

[51] Int. Cl.⁵ .............................................. B32B 27/40
[52] U.S. Cl. .................................... 428/216; 428/220; 428/412; 428/423.1; 428/423.3
[58] Field of Search ...................... 428/423.1, 332.335, 428/220, 423.3, 412, 419, 156, 172, 216; 180/90

[56] References Cited

U.S. PATENT DOCUMENTS 4,368,231 1/1983 Egert et al. .......................... 428/220

FOREIGN PATENT DOCUMENTS 0295494 12/1988 European Pat. Off. .
3722832 1/1989 Fed. Rep. of Germany .

Primary Examiner—James Seidleck
Assistant Examiner—Don Sumihiro
Attorney, Agent, or Firm—Joseph C. Gil; Aron Presis

[57] ABSTRACT

This invention relates to multilayer films composed of thermoplastic films, tough elastic polyurethane films and optionally a sealing layer and to the use of these multilayer films for the manufacture of crash pad films, i.e. as outer skin for automobile dash boards.

5 Claims, No Drawings

MULTILAYER FILMS FROM THE USE IN CRASH PADS

Multilayer films are known. They are used for packaging food, medical articles and sports articles and for loud speaker cones (see, for example, DE-OS No. 3 722 832).

Multilayer films are produced by coextrusion, extrusion coating or laminating.

For crash pad purposes, i.e. for use as outer skin for automobile dash boards only films based on PVC modified with various additives have hitherto proved satisfactory.

The requirements hitherto to be met by such films have been:
That they should be suitable for embossing,
that the embossed film should easily be shaped,
that the film should be resistant to conventional cleaning agents,
that the film should adhere to the material of the housing,
high impact strength and
no fogging.

With the exception of fogging, all these requirements are fulfilled by suitably modified PVC films.

New requirements according to which a crash pad film must have a temperature resistance of 130° C. cannot be fulfilled by PVC.

Numerous materials have been tested to establish whether they fulfil these new requirements, but without success.

It has now surprisingly been found that the films according to the invention fulfill both the requirements listed above and the requirement for temperature resistance.

The present invention relates to multilayerfilms having a thickness of from 0.8 mm to 2 mm, consisting of
(A) a thermoplastic film from 0.3 mm to 1.8 mm in thickness having a modulus of elasticity of from 1000 to 20,000 MPA at $-40°$ to $+130°$ C. and a long term temperature resistance of $\geq 130°$ C.,
(B) a tough elastic polyurethane film 0.4 mm to 1.5 mm in thickness having a shear modulus G of from $10°$ MPa to $10^3$ MPa in the temperature range of $-40°$ C. to $+130°$ C. and optionally
(C) a thermoplastic sealing layer 0.05 mm fo 0.1 mm in thickness whose mechanical loss factor tan $\delta$ is in the range of from $10^{-2}$ to $10^2$ MPa.

The invention also relates to the use of the multilayer films according to the invention for the production of crash pad films.

The thinner multilayer films according to EP-OS No. 0 295 494 (Le A 25 346) or DE-OS No. 3 722 832 are not suitable for this purpose, nor are multilayer films based on a polyurethane adhesive [see, for example, DE-PS No. 3 010 143 (Le A 20 254) and U.S. Pat. No. 4,368,231].

Films of component (A) suitable for the purpose of this invention include films of known thermoplastic polymers such as aromatic polycarbonates, aromatic polyaryl sulphones or polyphenylene sulphides.

Films (A) which are particularly suitable for this invention are those obtained from thermoplastic aromatic polycarbonates having molecular weights $\overline{M}_w$ (weight average) of from 10,000 to 200,000, preferably from 15,000 to 100,000, especially from 15,000 to 50,000 ($\overline{M}_w$ determined from the relative viscosity $\eta_{rel}$ in $CH_2Cl_2$ at 20° C. and at a concentration of 0.5 g per 100 ml). Other films (A) of thermoplastic polymers suitable for this invention include those obtained from known thermoplastic polyarylsulphones, which may be linear (see DE-OS No. 27 35 144) or branched (see DE-OS No. 27 35 092 and DE-OS No. 23 05 413).

The known aromatic polysulphones or polyether sulphones having molecular weights $\overline{M}_w$ (weight average determined by light scattering) from about 15,000 to about 55,000, preferably from about 20,000 to about 40,000 are particularly suitable linear polyarylsulphones. Such polyarylsulphones are described, for example, in DE-OS No. 17 19 244 and U.S. Pat. No. 3,365,517.

Suitable branched polyarylsulphones include in particular the branched polyarylether sulphones according to DE-OS No. 23 05 413 and U.S. Pat. No. 3,960,815 having molecular weights $\overline{M}_w$ from about 15,000 to about 50,000, preferably from about 20,000 to 40,000.

For details, see DE-AS No. 30 10 143.

Films of component (B) suitable for this invention include those obtained from polyester urethanes, polyether urethanes and polyether carbonate urethanes.

Suitable polyether urethanes may be prepared according to DE-PS No. 2 302 564, suitable polyester urethanes according to DE-OS No. 2 842 806 and suitable polyether carbonate urethanes according to DE-OS No. 2 248 382.

Polyether carbonateurethanes having a specific gravity of from 1.13 to 1.17 $g/cm^3$, preferably 1.15 $g/cm^3$, are particularly preferred.

Thermoplastic sealing layers of component (C) suitable for the present invention include those based on nitrocellulose as well as polyurethane layers based on aliphatic or aromatic polyurethanes which are tack-free at room temperature, especially aliphatic polyether urethanes.

The sealing layers (C) suitable for this invention may be prepared from aqueous dispersions of preferably linear polyester polyurethanes which dry to form transparent films and which may contain a higher functional polyisocyanate as cross-linking agent. Suitable polyurethane dispersions include, for example, those of linear polyester diols, aromatic or aliphatic diisocyanates and optionally conventional chain lengthening agents prepared with the addition of ionic components according to the teaching of U.S. Pat. No. 3,479,310 or DE-AS No. 14 95 847. Aqueous dispersions of preferably linear polyester polyurethanes containing carboxylate and sulphonate groups as obtained according to DE-OS No. 28 04 609 are also very suitable. When organic solutions of preferably linear polyester polyurethanes are to be used, the solutions are preferably of nonionic linear polyester polyurethanes in suitable solvents. These polyurethanes are preferably reaction products of
(a) aromatic diisocyanates such as 2,4- and/or 2,6-diisocyanatotoluene, 4,4-diisocyanatodiphenylmethane, hexamethylene diisocyanate, isophorone diisocyanate or 1,5-diisocyanatonaphthalene or mixtures thereof with
(b) polyester diols in the molecular weight range ($\overline{M}_w$) of from 1000 to 4000, in particular those based on adipic acid and suitable glycols such as ethylene glycol, 1,4-dihydroxybutane, 1,6-dihydroxyhexane or mixtures thereof and optionally
(c) chain lengthening agents, for example the last mentioned glycols, the reactants being put into the process in such proportions that an NCO/OH equivalent ratio of from 0.9:1 to 1:1.1, preferably from 0.95:1 to 1:1 is maintained and from 0.1 to 2 mol of chain lengthening agent or mixture of chain lengthening agents being optionally used per mol of polyester diol.

Examples of suitable solvents for such polyester polyurethanes include ethyl acetate, butyl acetate, methyl ethyl ketone, methyl isobutyl ketone and mixtures of such solvents. The dispersions or solutions are generally used at a solids content of from 10 to 40% by weight. It is frequently advantageous to incorporate minor quantities of a higher functional polyisocyanate in these solutions, for example tris-(6-isocyanatohexyl)-biuret, for improving the mechanical properties of the polyurethane film finally obtained.

The thermoplastic sealing layers (C) used for this invention may be layers of nitrocellulose.

The composite product of thermoplastic film (A) and thermoplastic polyurethane layer (B) may be produced either by coextrusion of the two materials by means of a two-channel broad sheeting die in which the channels are thermally separated or by extrusion coating of the polyurethane film (B) with the molten thermoplastic polymer (A).

The molten coextrudate or the melt-coated polyurethane film is drawn off over cooling rollers and rolled up.

Application of the sealing layer (C) to the outer surface of the thermoplastic film (A) is carried out in known manner, for example by coating with a roll coater or by curtain coating or screen printing. Application of the sealing layer is followed by removal of the solvent or water by evaporation in a conventional drying oven at temperatures from 40° to 100° C. For drying an aqueous sealing layer it is particularly advantageous to use a microwave drier.

EXAMPLES

EXAMPLE 1

A film of aromatic polycarbonate based on bisphenol A and having an $\overline{M}_w$ of 30,000 (determined by $\eta_{rel}$ in $CH_2Cl_2$ at 20° C. and at a concentration of 0.5 g/100 ml) having a thickness of 600 μm is coated in known manner with the melt of a polyether carbonate urethane of density 1.15 g/cm³ by extrusion coating so that the total thickness of the composite material is 1100 μm. The draw-off roller over which the molten polyether carbonate urethane runs is embossed for producing a textured polyether carbonate urethane layer.

The composite film thus obtained is shaped by thermoforming in known manner.

EXAMPLE 2

A film of thermoplastic polyester urethane having a density of 1.20 g/cm³ and a thickness of 400 μm is coated in known manner with the melt of a polyarylsulphone having an $\overline{M}_w$ of 40,000 (determined by light scattering) so that the composite material obtained has a thickness of 900 μm. In this process, the press roller of the draw-off system has an embossed surface while the cooling roller has a smooth surface so that the polyester urethane film of the resulting composite system has an embossed surface. For improving the subsequent adherence to the core material, the free polyaryl sulphone surface is coated with an aqueous dispersion of a polyester polyurethane in a thickness of 20 μm. The film thus prepared is shaped in known manner by the thermoforming process.

The special properties of this system according to the invention is distinguished by
high temperature resistance (up to 140° C.),
high impact strength at temperatures in the range of from −40° C. to +140° C.
high abrasion resistance,
excellent deformability,
excellent bonding to the core material and
freedom from fogging.

We claim:
1. Multilayer films having a thickness of from 0.8 to 2 mm, consisting of
(A) a thermoplastic film from 0.3 mm to 1.8 mm in thickness having an E-modulus from 1000 to 20,000 MPa at −40° C. to +130° C. and a long term temperature resistance of $\geq 130°$ C.,
(B) a tough elastic polyurethane film from 0.4 mm to 1.5 mm in thickness having a shear modulus G of from 10° MPa to $10^3$ MPa in the temperature range of from −40° C. to +130° C., and optionally
(C) a thermoplastic sealing layer from 0.05 mm to 0.1 mm in thickness whose mechanical loss factor tan δ is in the range of from $10^{-2}$ to $10^2$ MPa.

2. Film according to claim 1, wherein the thermoplastic film (A) consists of a polycarbonate based on bisphenol (A) having an $\overline{M}_w$ of from 15,000 to 50,000 (determined by $\eta_{rel}$ at 20° C. and 0.5 g/100 ml of $CH_2Cl_2$).

3. Film according to claim 1, wherein the tough elastic, thermoplastically processable film (B) consists of a polyether carbonate urethane having a specific gravity of from 1.13 to 1.17 g/m³.

4. Film according to claim 1, wherein the sealing layer (C) consists of an aliphatic polyether urethane.

5. An automobile dash board comprising an outer skin which includes the film of claim 1.

* * * * *